United States Patent [19]

Noodleman

[11] 3,819,964

[45] June 25, 1974

[54] COMMUTATING STRUCTURE FOR D.C. PERMANENT MAGNET MACHINES

[75] Inventor: Samuel Noodleman, Blacksburg, Va.

[73] Assignee: Kollmorgen Corporation, Hartford, Conn.

[22] Filed: July 30, 1973

[21] Appl. No.: 383,883

[52] U.S. Cl. .................. 310/46, 310/219, 310/128
[51] Int. Cl. .......................................... H02k 13/00
[58] Field of Search...... 310/40 R, 40 MM, 46, 156, 310/219, 231, 238, 248, 128

[56] References Cited
UNITED STATES PATENTS

| 388,513 | 8/1888 | Van Gestel | 310/219 |
|---|---|---|---|
| 399,329 | 3/1889 | Heywood | 310/219 |
| 1,375,161 | 4/1921 | Landers | 310/219 |
| 2,194,211 | 3/1940 | Sansom | 310/46 X |
| 2,409,600 | 10/1946 | Trautschold | 310/219 |
| 2,467,758 | 4/1949 | Lindenblad | 310/219 X |
| 3,341,726 | 9/1967 | Brinster et al. | 310/219 X |
| 3,396,296 | 8/1968 | Esters | 310/46 X |
| 3,534,203 | 10/1970 | Sommeria | 310/46 X |
| 3,544,868 | 12/1970 | Bates | 310/231 X |
| 3,603,823 | 9/1971 | Mason | 310/46 |

FOREIGN PATENTS OR APPLICATIONS

| 1,065,579 | 5/1954 | France | 310/219 |

*Primary Examiner*—D. F. Duggan
*Attorney, Agent, or Firm*—Morgan, Finnegan, Durham & Pine

[57] ABSTRACT

A DC permanent magnet machine in which the functions typically attributed to the stator and rotor assemblies are reversed to provide an "inside out" design. The stator is provided with a plurality of electrically energizable poles having windings which are electrically coupled to associated commutator bars forming an annular array. Also associated with the stator are a pair of annular conductive rings. The rotor is provided with a plurality of permanent magnet poles equal in number to the poles provided in the stator. The rotor also carries a plurality of roller contacts which serve to couple the commutator bars to the conductive rings which are in turn connected to opposite polarities of the DC energizing source, thereby providing electrical power to associated coils of the stator winding.

14 Claims, 5 Drawing Figures

COMMUTATING STRUCTURE FOR D.C. PERMANENT MAGNET MACHINES

BACKGROUND OF THE INVENTION

DC motors of conventional design typically utilize a multi-pole permanent magnet stator and a rotor having a plurality of energizable conductors arranged about the surface thereof and parallel to the axis of rotation. Pairs of said conductors are electrically energized by rotating commutator bars provided on the rotor, which commutator bars are electrically energized by a DC source through stationary commutator brushes which make wiping engagement with the commutator bar array. Interaction of the stator permanent magnet fields with the magnetic fields created by DC energization of the rotor conductors provides for rotation of the rotor, whereby relative rotation of the commutator bars and commutator brushes continuously changes the electrical connections between the DC source and the array of conductors in the rotor. Significant wearing of the commutator brushes and commutator bars is caused by both the sliding friction of the brushes and the burning action of the commutating current, thereby reducing the useful operating life of the motor.

The above disadvantages, as well as the fact that conventional DC motors have high inertia, has led to the development of the "inside out" motor design in which the multi-pole rotor is provided with permanent magnet members and the stator is provided with an equal number of poles whose windings are energized by the DC source. This design provides a rotor with lower inertia for a given peak torque, and a stator having greater copper volume and better heat dissipation as compared with conventional DC motor designs. Thus, the "inside out" motor design has a higher continuous rating in contrast to conventional DC motors of the same size and weight.

The problems of commutation in motors of the "inside out" type has led to the development of a DC brushless type motor which employs electronic amplifiers and other solid state circuit elements to provide the necessary commutation. The electronic amplifiers and circuit elements required for proper switching of power to the stator windings to generate the rotating field add significant cost and weight to the motor. The solid state switching circuitry also increases motor "cogging" which occurs during low speed motor operation.

BRIEF DESCRIPTION OF THE INVENTION

The numerous problems and disadvantages encountered in DC motors of both the conventional and "inside out" design has led to the development of the present invention which is characterized by providing novel mechanical switching techniques for commutating the motor windings.

In a preferred embodiment of this invention the stator assembly is provided with first and second annular conductive rings connected to opposite polarities of a DC source and an annular array of commutator bars disposed proximate thereto. The rotor assembly is provided with a plurality of roller contacts which revolve with the rotation of the rotor shaft to simultaneously couple the opposite terminals of the stator coils to the opposite polarities of the DC source so as to progressively energize stator coils, the magnetic fields of which interact with the rotating magnetic fields of the rotor permanent magnets to effect rotor rotation.

Thus, conventional commutation, in which brush and commutator wear is caused by sliding friction and the burning action of commutating current, is replaced by the rolling contact between the conductive rings and the commutator bars. This novel commutation technique permits the motor components to be designed for optimum commutation, minimum wear and smooth operation.

The unique commutation method of the present invention is, of course, also adaptable for use in conventional DC motor design wherein the annular arrays of commutator bars and conductive rings are incorporated in the rotor design and the roller contacts form part of the stator.

BRIEF DESCRIPTION OF THE DRAWINGS

The invention is set forth in greater detail in the specification of which the following drawings form a part.

DETAILED DESCRIPTION

Figure 1:
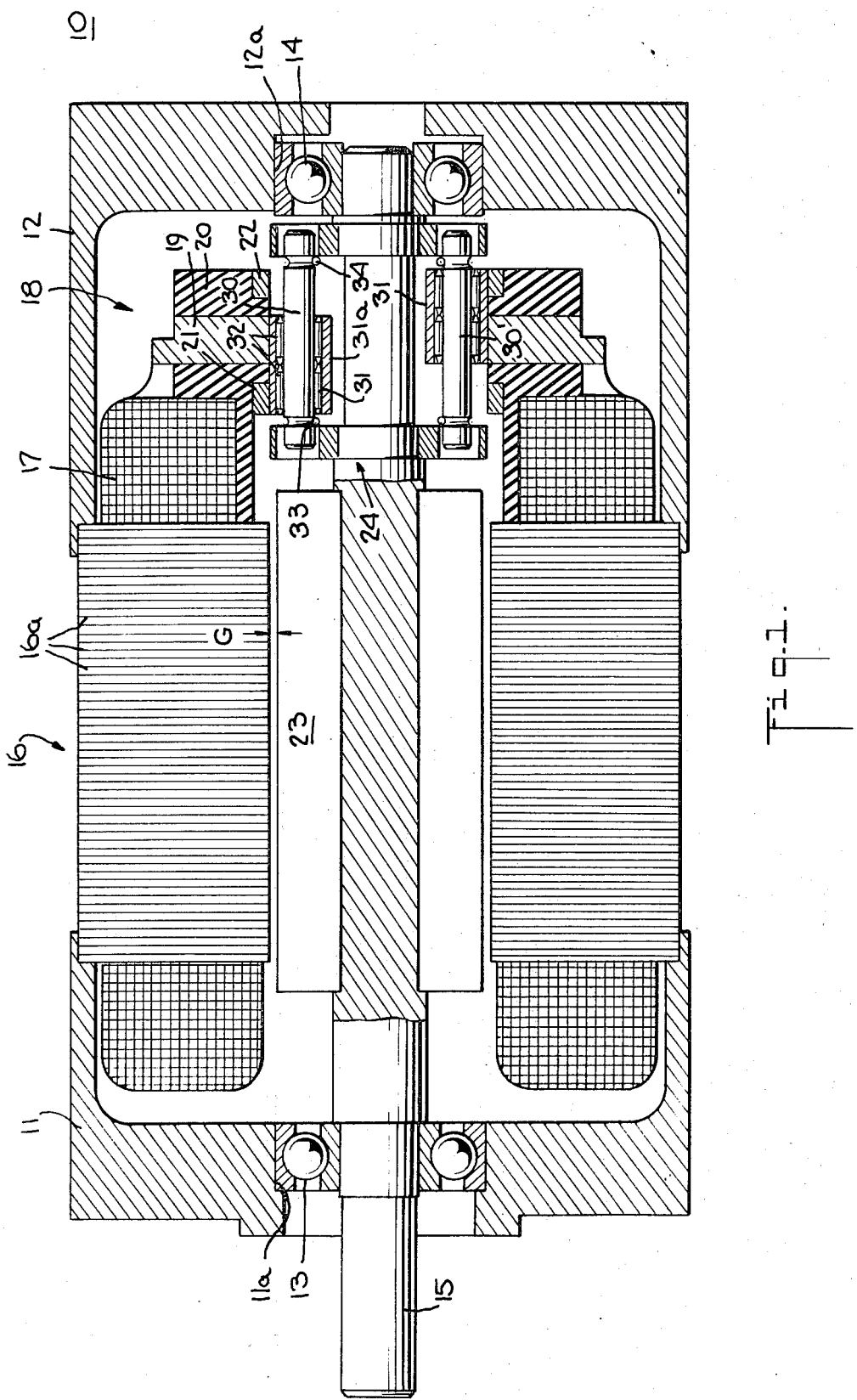
FIG. 1 is a sectional view of a preferred embodiment of the invention.

FIG. 1 shows a preferred embodiment 10 of the invention which is comprised of housing members 11 and 12 which are each provided with openings 11a and 12a for receiving bearings 13 and 14 which surround a rotatably mounted rotor shaft 15. The inner ends of housing members 11 and 12 are hollow and are contoured or otherwise formed to receive and support the stator and rotor assemblies.

The stator assembly is comprised of a laminated core 16 formed of individual laminations 16a. The stator winding is comprised of a plurality of coils 17 (not shown in detail for purposes of simplicity) which, when energized, create magnetic fields in the stator core which interact with the magnetic fields set up in the rotor assembly to effect rotor rotation.

Figure 2:
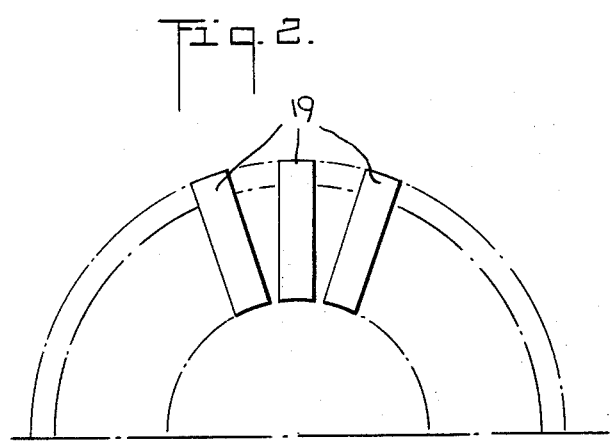
FIG. 2 is a partial sectional view of the commutator bar array of FIG. 1.
Figure 3:
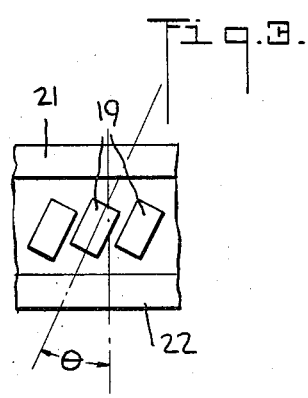
FIG. 3 is an interior radial view of the commutator bar array of FIG. 1.

Housing member 12 is further adapted to receive the commutator assembly 18 which includes a plurality of commutator bars 19 mounted in radial fashion (see FIG. 2) within an annular-shaped insulating member 20. Selected ones of the commutator bars are electrically connected to one terminal of associated stator coils, while the remaining commutator bars are each electrically connected to the remaining terminal of associated stator coils. As shown in FIG. 3, the commutator bars 19 are aligned at an angle $\theta$ with respect to each other so that a roller contact moving left to right with respect to FIG. 3 will effect a make-before-break contact with the commutator bars. The angle $\theta$ is preferrably on the order of 25° although the precise angle selected depends upon the particular motor design.

A pair of conductive rings 21 and 22 are mounted within grooves provided in annular-shaped insulating member 20 and positioned on opposite sides of the commutator bar array. Conductive rings 21 and 22 are respectively connected to the plus and minus terminals of the DC source (not shown). While shown in FIG. 1 as disposed on opposite sides of the commutator bar array 19, both conductive rings 21 and 22 may be positioned on the same side of the commutator bar array if desired.

The rotor assembly comprises a permanent magnet array 23 secured to shaft 15. The outer periphery of the permanent magnet array lies a small, spaced distance from the interior periphery of the stator core 16 to form a hollow annular-shaped gap G-therebetween.

Figure 4:
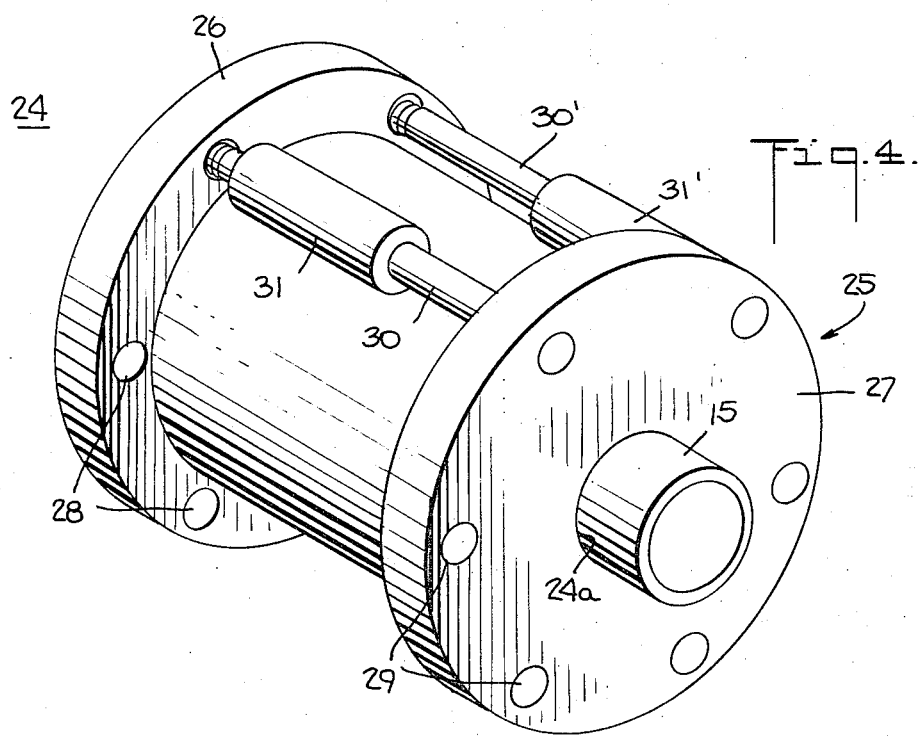
FIG. 4 is a perspective view of the roller contact assembly of FIG. 1.

Referring now to FIG. 4, there is shown a roller contact assembly 24 comprising a cylindrical drum 25 secured to shaft 15 by means of a central opening 24a. The ends of drum 25 are provided with integral formed annular flanges 26 and 27 each having an array of spaced openings 28 and 29. The openings of the array in flange 26 are opposite the associated openings of the array in flange 27 and are adapted to receive a shaft 30 which is secured therein so as to experience no rotation about its longitudinal axis.

Referring once again to FIG. 1, a roller contact 31 is rotatably mounted upon shaft 30 by bearings 32. Roller contact 31 is preferably formed of a suitable contact material such as electro-graphitic carbon, carbon graphite, silver graphite, silver cadmium oxide or silver tungsten. While roller contact 31 is free to rotate about shaft 30, bearing 32 has its inner race secured to shaft 30 to prevent contact 31 from moving linearly along shaft 30.

Roller contact 31 is positioned along shaft 30 so as to make continuous rolling engagement with conductive ring 21 and sequential and progressive engagement with the radial array of commutator bars 19.

A second roller contact 31' is associated with roller contact 31 and is positioned a spaced angular distance around drum 25. Roller contact 31' is rotatably mounted to a shaft 30' by bearings similar to bearings 32. Roller contact 31', in addition to being angularly displaced from roller contact 31, is linearly displaced relative to roller contact 31 so as to make continuous rolling contact with conductive ring 22 as well as to make sequential and progressive rolling engagement with commutator bars 19.

The angular displacement between roller contacts 31 and 31' is such that the roller contacts will simultaneously engage a pair of displaced commutator bars which are connected to the end terminal of a common stator coil to couple opposite polarities of the energizing source thereto. Although not shown for purposes of simplicity, a number of pairs of roller contacts are arranged around drum 25 for electrically energizing a like number of coils to develop magnetic fields in the stator which interact with the rotating magnetic fields of the rotor permanent magnets to sustain rotation of the rotor shaft.

Shaft 30 is biased at each end by springs 33 and 34 to urge roller contact 31 into firm electrical engagement with the associated conductive ring and commutator bars. As the angular velocity of the rotor shaft increases, the centifugal force created serves to assist springs 33 and 34 in providing good electrical contact.

Figure 5:
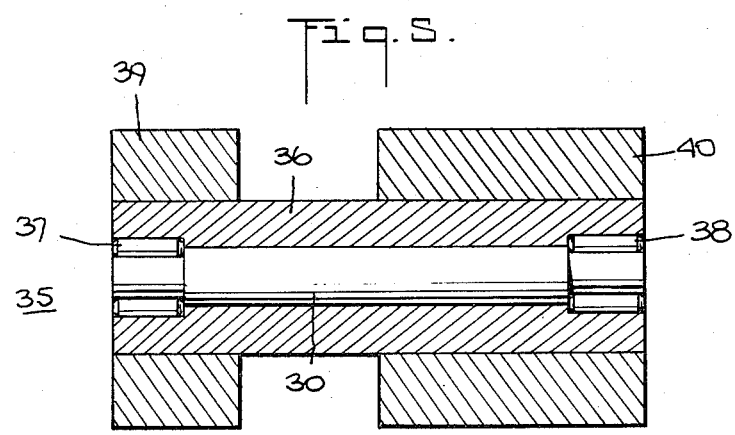
FIG. 5 is a sectional view of a roller contact which may be used with the embodiment of FIG. 1.

FIG. 5 shows an alternative roller contact assembly 35 for use with the embodiment of FIG. 1 comprising a tubular conductive member 36 rotatably mounted to shaft 30 by bearings 37 and 38 which are secured within grooves provided in conductive member 36 and shaft 30.

A first, shorter sleeve 39 is secured to conductive member 36 and is positioned to make contact with one of the conductive rings 21 or 22. Sleeve 39 may preferably be formed of a suitable contact material such as electro-graphitic carbon or silver graphite. A second longer sleeve 40 is secured to member 36 a spaced distance from sleeve 39 and makes contact with the commutator bars 19. Sleeve 40 is also preferably formed of a suitable contact material such as electro-graphitic carbon or silver graphite. The use of two separate sleeves enables selection of materials which are best suited for the particular application.

In operation, the current in the sleeve engaging conductive ring 21 (or 22) passes through conducting member 36 and sleeve 40 so as to be selectively and progressively transferred to the commutator bars 19.

It is generally accepted that energizing windings utilizing the DC brushless concept requires relatively large numbers of solid state components in an electronic control circuit in order to develop the effect of the large number of commutator bar segments which are necessary for smooth operation at slow speeds. In view of the foregoing, another application of the present invention is to use the commutation techniques described herein to effect smooth DC brushless motor operation at slow speeds and then switch to a static control incorporating a smaller number of solid state circuit elements to energize the windings during high speed operation. Such an arrangement would serve to provide a smooth operating motor at slow speeds and to provide the long life operation of the DC brushless control circuit for high speed conditions.

The novel DC motor described herein, in contrast to conventional DC motors, permits the use of a rotor assembly having a relatively small mass and a corresponding low moment of inertia. Moreover, the permanent magnet members may be of the ceramic type to further reduce the mass of the rotor assembly. Effecting commutator switching in the stator assembly permits the use of a larger copper volume which significantly reduces the amount of heating occurring in the electrically energized stator assembly, which serves to prolong the useful operating life of the motor. Also, having the windings in the stator eliminates the stress normally experienced by rotor-mounted windings, thereby prolonging the life of the windings and the motor.

The invention disclosed and claimed herein is not limited to the specific mechanisms and techniques herein shown and described since modifications will undoubtedly occur to those skilled in the art. Hence, departures may be made from the form of the instant invention without departing from the principles thereof.

What is claimed is:

1. Switching apparatus for a machine responsive to a source of DC power and having interacting rotor and stator assemblies wherein at least one of said assemblies if provided with a winding having a plurality of energizeable coils, said coils having an annular array of commutator bars associated therewith for supplying electrical power thereto, and the other of said assemblies having a plurality of permanent magnets associated therewith, said apparatus comprising:

a. first and second annular conductive rings associated with said assembly having said winding, said conductive rings being adapted respectively for coupling to opposite polarities of said DC source; and
b. first and second roller contact means associated with the other of said assemblies whereby said contact means and said commutator bars rotate relative to each other:
   i. said first roller contact means being adapted to progressively and sequentially engage said commutator bars and to continuously engage said first conductive ring to momentarily couple said commutator bars to said first conductive ring;
   ii. said second roller contact means being displaced from said first roller contact means and adapted to progressively and sequentially engage said commutator bars and to continuously engage said second conductive ring to momentarily couple said commutator bars to said second conductive ring.

2. The apparatus of claim 1 wherein said first and second roller contact means are angularly displaced from one another so as to simultaneously engage commutator bars associated with the same coil.

3. The apparatus according to claim 1 wherein said first and second conductive rings are disposed on opposite sides of said annular array of commutator bars.

4. The apparatus of claim 3 wherein said first and second roller contact means are linearly displaced from one another.

5. The apparatus of claim 1 wherein the axes of said commutator bars are disposed at an acute angle with respect to each other so that when said first and second roller contact means engage said commutator bars they effect a make-before-break contact sequence.

6. Switching apparatus for a machine responsive to a source of DC power, said apparatus comprising:
a. a stator assembly having a winding comprising a plurality of energizable coils, said coils having an annular array of commutator bars associated therewith for supplying electrical power thereto;
b. a rotor assembly including permanent magnet means for creating a rotating magnetic field;
c. first and second annular conductive rings associated with said stator assembly and said commutator bars, said conductive rings being adapted respectively for coupling to opposite polarities of said DC source; and
d. first and second roller contact means associated with said rotor assembly whereby said roller contact means and said commutator bars rotate relative to each other:
   i. said first roller contact means being adapted to progressively and sequentially engage said commutator bars and to continuously engage said first conductive ring to momentarily couple said commutator bars to said first conductive ring,
   ii. said second roller contact means being displaced from said first roller contact means and adapted to progressively and sequentially engage said commutator bars and to continuously engage said second conductive ring to momentarily couple said commutator bars to said second conductive ring.

7. Apparatus according to claim 6 wherein said roller contact means includes roller contacts comprising an electro-graphitic material.

8. Apparatus according to claim 7 wherein said electro-graphitic material is silver graphite.

9. Apparatus according to claim 6 wherein said rotor assembly includes a roller contact support assembly adapted to rotate with said rotor.

10. Apparatus according to claim 6 wherein said conductive rings are disposed on opposite sides of said annular array of commutator bars and said first and second roller contact means are linearly displaced from one another.

11. Apparatus according to claim 6 wherein said first and second roller contact means are angularly displaced from one another so as to simultaneously engage the commutator bars associated with the same coil.

12. Apparatus according to claim 6 wherein the axes of said commutator bars are disposed at an acute angle with respect to each other so that when said first and second roller contact means engage said commutator bars they effect a make-before-break contact sequence.

13. Apparatus according to claim 6 wherein said first and second roller contact means comprise tubular conductive members having first and second conductive sleeves for respectively engaging a conductive ring and said commutator bars.

14. Apparatus according to claim 13 wherein at least one of said conductive sleeves comprises an electro-graphitic material.

* * * * *